US008842712B2

(12) United States Patent
Hancock (10) Patent No.: US 8,842,712 B2
(45) Date of Patent: Sep. 23, 2014

(54) METHODS AND APPARATUSES FOR RECEPTION OF FREQUENCY-HOPPING SPREAD SPECTRUM RADIO TRANSMISSIONS

(75) Inventor: Gregory C. Hancock, Sausalito, CA (US)

(73) Assignee: Gregory C. Hancock, Sausalito, CA (US)

( * ) Notice: Subject to any disclaimer, the term of this patent is extended or adjusted under 35 U.S.C. 154(b) by 115 days.

(21) Appl. No.: 13/425,845

(22) Filed: Mar. 21, 2012

(65) Prior Publication Data

US 2012/0243576 A1    Sep. 27, 2012

Related U.S. Application Data

(60) Provisional application No. 61/467,094, filed on Mar. 24, 2011.

(51) Int. Cl.
*H04B 1/00* (2006.01)
*H04B 1/7156* (2011.01)

(52) U.S. Cl.
CPC .................................. *H04B 1/7156* (2013.01)
USPC ............................. 375/136; 375/130; 375/132

(58) Field of Classification Search
USPC ......................................................... 375/136
See application file for complete search history.

(56) References Cited

U.S. PATENT DOCUMENTS

| | | |
|---|---|---|
| 3,069,564 A | 12/1962 | Lange |
| 4,799,059 A | 1/1989 | Grindahl et al. |
| 4,843,638 A | 6/1989 | Walters |
| 5,428,602 A | 6/1995 | Kemppainen |
| 5,442,281 A | 8/1995 | Frisch et al. |
| 5,475,867 A | 12/1995 | Blum |
| 5,610,394 A | 3/1997 | Lee |
| 5,673,252 A | 9/1997 | Johnson et al. |
| 5,705,953 A | 1/1998 | Jesser |
| 5,798,670 A | 8/1998 | Lee |
| 5,910,774 A | 6/1999 | Capriotti et al. |
| 5,918,380 A | 7/1999 | Schleich et al. |
| 5,963,146 A | 10/1999 | Johnson et al. |
| 5,987,062 A * | 11/1999 | Engwer et al. ................ 375/225 |
| 6,006,212 A | 12/1999 | Schleich et al. |
| 6,026,355 A | 2/2000 | Rahman et al. |

(Continued)

OTHER PUBLICATIONS

Nixon, Mark and Aguado, Alberto; "Feature Extraction & Image Processing"; Copyright 2002 Reed Elsevier plc Group, pp. 173-214.

(Continued)

*Primary Examiner* — Erin File
(74) *Attorney, Agent, or Firm* — Alston & Bird LLP (57) ABSTRACT

A frequency-agile radio receiver controlled by a radio controller hops through a plurality of radio frequencies where discrete frequency-hopping spread spectrum digital transmissions may exist, where the transmitter's hopping sequence is not known, and where it is not necessary to receive every transmission of interest. The controller accumulates counters of the number of transmissions of interest it receives at each of a plurality of frequencies. It then creates a new frequency-hopping sequence consisting primarily of those frequencies whose received transmission counts exceed a certain threshold. The controller continues to tune the receiver in a hopping pattern, allocating more of the receiver's time to those frequencies where more transmissions have been received in the past. Doing so improves the likelihood that transmissions of interest will be received in the future.

37 Claims, 3 Drawing Sheets

(56) References Cited

U.S. PATENT DOCUMENTS

| | | |
|---|---|---|
| 6,172,616 B1 | 1/2001 | Johnson et al. |
| 6,181,225 B1 | 1/2001 | Bettner |
| 6,188,715 B1 | 2/2001 | Partyka |
| 6,212,221 B1 * | 4/2001 | Wakayama et al. ............ 375/133 |
| 6,218,995 B1 | 4/2001 | Higgins et al. |
| 6,219,655 B1 | 4/2001 | Schleich et al. |
| 6,262,685 B1 | 7/2001 | Welch et al. |
| 6,297,708 B1 | 10/2001 | Lemay |
| 6,321,074 B1 | 11/2001 | Lemay |
| 6,333,975 B1 | 12/2001 | Brunn et al. |
| 6,357,034 B1 | 3/2002 | Muller et al. |
| 6,373,236 B1 | 4/2002 | Lemay, Jr. et al. |
| 6,373,399 B1 | 4/2002 | Johnson et al. |
| 6,417,729 B1 | 7/2002 | Lemay et al. |
| 6,606,065 B1 | 8/2003 | Payne et al. |
| 6,636,893 B1 | 10/2003 | Fong |
| 6,639,957 B2 | 10/2003 | Cahill-O'Brien et al. |
| 6,653,945 B2 | 11/2003 | Johnson et al. |
| 6,756,914 B1 | 6/2004 | Fitzgerald et al. |
| 6,852,935 B2 | 2/2005 | Higgins et al. |
| 6,868,293 B1 | 3/2005 | Schurr et al. |
| 6,934,316 B2 | 8/2005 | Cornwall et al. |
| 6,973,400 B2 | 12/2005 | Cahill-O'Brien et al. |
| 6,996,154 B2 | 2/2006 | Haas |
| 7,075,288 B2 | 7/2006 | Martin et al. |
| 7,079,962 B2 | 7/2006 | Cornwall et al. |
| 7,089,125 B2 | 8/2006 | Sonderegger |
| 7,109,882 B2 | 9/2006 | Angelis et al. |
| 7,116,243 B2 | 10/2006 | Schleich et al. |
| 7,119,698 B2 | 10/2006 | Schleich et al. |
| 7,154,041 B2 | 12/2006 | Payne et al. |
| 7,154,938 B2 | 12/2006 | Cumeralto et al. |
| 7,209,049 B2 | 4/2007 | Dusenberry et al. |
| 7,216,108 B2 | 5/2007 | Hastings et al. |
| 7,218,223 B2 | 5/2007 | Seal et al. |
| 7,230,972 B2 | 6/2007 | Cornwall et al. |
| 7,245,511 B2 | 7/2007 | Lancaster et al. |
| 7,269,522 B2 | 9/2007 | Peters et al. |
| 7,283,062 B2 | 10/2007 | Hoiness et al. |
| 7,283,580 B2 | 10/2007 | Cumeralto et al. |
| 7,283,916 B2 | 10/2007 | Cahill-O'Brien et al. |
| 7,287,659 B2 | 10/2007 | Higgins |
| 7,298,135 B2 | 11/2007 | Briese et al. |
| 7,298,288 B2 | 11/2007 | Nagy et al. |
| 7,317,404 B2 | 1/2008 | Cumeralto et al. |
| 7,336,200 B2 | 2/2008 | Osterloh et al. |
| 7,343,255 B2 | 3/2008 | Osterloh et al. |
| 7,346,030 B2 | 3/2008 | Cornwall |
| 7,362,236 B2 | 4/2008 | Hoiness |
| 7,372,372 B2 | 5/2008 | Osterloh et al. |
| 7,372,373 B2 | 5/2008 | Borisov et al. |
| 7,376,118 B2 | 5/2008 | Osterloh et al. |
| 7,400,904 B2 | 7/2008 | Cornwall et al. |
| 7,412,236 B1 | 8/2008 | Blight et al. |
| 7,417,557 B2 | 8/2008 | Osterloh et al. |
| 7,453,373 B2 | 11/2008 | Cumeralto et al. |
| 7,463,980 B2 | 12/2008 | Hoiness et al. |
| 7,479,895 B2 | 1/2009 | Osterloh et al. |
| 7,495,555 B2 | 2/2009 | Seal et al. |
| 7,510,422 B2 | 3/2009 | Showcatally et al. |
| 7,516,026 B2 | 4/2009 | Cornwall et al. |
| 7,535,378 B2 | 5/2009 | Cornwall |
| 7,540,766 B2 | 6/2009 | Makinson et al. |
| 7,561,062 B2 | 7/2009 | Schleich et al. |
| 7,577,181 B2 | 8/2009 | Cornwall et al. |
| 7,639,000 B2 | 12/2009 | Briese et al. |
| 7,668,670 B2 | 2/2010 | Lander |
| 7,671,814 B2 | 3/2010 | Savage et al. |
| 7,688,060 B2 | 3/2010 | Briese et al. |
| 7,688,061 B2 | 3/2010 | Briese et al. |
| 7,701,199 B2 | 4/2010 | Makinson et al. |
| 7,729,852 B2 | 6/2010 | Hoiness et al. |
| 7,756,030 B2 | 7/2010 | Clave et al. |
| 7,756,078 B2 | 7/2010 | Wyk et al. |
| 7,764,714 B2 | 7/2010 | Monier et al. |
| 7,826,398 B2 | 11/2010 | Monier |
| 7,827,268 B2 | 11/2010 | Monier et al. |
| 7,830,874 B2 | 11/2010 | Cornwall et al. |
| 7,843,391 B2 | 11/2010 | Borisov et al. |
| 7,843,834 B2 | 11/2010 | Picard |
| 7,844,409 B2 | 11/2010 | Johnson et al. |
| 7,847,536 B2 | 12/2010 | Haddab et al. |
| 7,847,537 B2 | 12/2010 | Makinson et al. |
| 7,848,362 B2 | 12/2010 | Picard |
| 7,891,246 B2 | 2/2011 | Lander |
| 7,904,262 B2 | 3/2011 | Lancaster et al. |
| 7,929,916 B2 | 4/2011 | Picard |
| 7,948,396 B2 | 5/2011 | Cornwall |
| 7,949,499 B2 | 5/2011 | Gervais et al. |
| 7,965,758 B2 | 6/2011 | Picard |
| 7,973,673 B2 | 7/2011 | Payne et al. |
| 7,986,246 B2 | 7/2011 | Angelis et al. |
| 7,986,718 B2 | 7/2011 | Monier |
| 7,994,933 B2 | 8/2011 | Cahill-O'Brien et al. |
| 7,994,994 B2 | 8/2011 | Savage et al. |
| 7,997,150 B2 | 8/2011 | Cooper |
| 7,999,532 B2 | 8/2011 | Briese et al. |
| 8,024,724 B2 | 9/2011 | Garrison Stuber et al. |
| 8,031,082 B2 | 10/2011 | Cornwall |
| 8,040,664 B2 | 10/2011 | Makinson et al. |
| 8,045,537 B2 | 10/2011 | Picard |
| 8,049,642 B2 | 11/2011 | Makinson et al. |
| 8,054,821 B2 | 11/2011 | Monier et al. |
| 8,055,461 B2 | 11/2011 | Stuber et al. |
| 8,059,009 B2 | 11/2011 | Van Wyk et al. |
| 8,059,011 B2 | 11/2011 | Van Wyk et al. |
| 8,116,071 B2 | 2/2012 | Showcatally |
| 8,122,775 B2 | 2/2012 | Anderson et al. |
| 8,135,564 B2 | 3/2012 | Gervais et al. |
| 8,138,944 B2 | 3/2012 | Stuber et al. |
| 8,164,479 B2 | 4/2012 | Osterloh et al. |
| 2003/0096576 A1 * | 5/2003 | Salonidis et al. ............... 455/41 |
| 2007/0237121 A1 * | 10/2007 | Khandelwal et al. ......... 370/338 |
| 2010/0226342 A1 * | 9/2010 | Colling et al. ................ 370/336 |
| 2013/0202013 A1 * | 8/2013 | Van Stralen et al. .......... 375/133 |

OTHER PUBLICATIONS

AMRUSB-1, 900 MHz AMR receiver with USB, Interface Data Sheet, Grid Insight (2011) 5 pages.

AMRUSB-1 Utility Meter Data Receiver, Firmware Version 0.0.2 (Beta), Interface Specification, Grid Insight (Jul. 13, 2011) 16 pages.

\* cited by examiner

METHODS AND APPARATUSES FOR RECEPTION OF FREQUENCY-HOPPING SPREAD SPECTRUM RADIO TRANSMISSIONS

CROSS-REFERENCE TO RELATED APPLICATIONS

This application claims priority from U.S. Provisional Application Ser. No. 61/467,094, filed on Mar. 24, 2011, entitled "Method for Reception of Frequency-Hopping Spread Spectrum Radio Transmissions When Hopping Frequencies Are Not Known" which is hereby incorporated by reference in its entirety.

FIELD

Example embodiments relate to communications systems configured to receive wireless communications. More particularly, some example embodiments relate to communications system for receiving frequency-hopping spread spectrum radio transmissions.

BACKGROUND

Digital data radio systems, such as, but not limited to, those employed in electricity, gas, and water utility automated meter reading (AMR), industrial supervisory control and data acquisition (SCADA), building automation, residential home automation, and other wireless data networks, often employ spread-spectrum radio technology to reduce communications problems caused by interference, and for other reasons.

One type of spread-spectrum radio technology is frequency-hopping spread spectrum (FHSS). A frequency-hopping spread spectrum radio transmitter employs a single carrier frequency at any given moment, but it employs a plurality of carrier frequencies over time and changes the carrier frequency often. The frequency channels and hopping sequence that the transmitter employs may be random, pseudo-random, or predetermined. Hops in the sequence may range within known or unknown upper and lower bounds.

A single-channel radio receiver is a radio receiver capable of tuning to only one carrier frequency at a time. A single-channel radio receiver may be fixed-frequency, meaning that the carrier frequency cannot be changed, or it may be frequency-agile, meaning that the carrier frequency can be quickly and easily changed through software or firmware without requiring any physical changes to the receiver's circuitry.

Reliable reception of the radio signals emitted by a frequency-hopping spread spectrum transmitter using a single-channel receiver requires the receiver controller to adjust the receiver's carrier frequency in synchrony with the transmitter's carrier frequency changes. Use of this frequency selection (a.k.a. tuning or hopping) technique has generally required the controller to employ the same frequency-hopping sequence and channels as the transmitter.

A single channel receiver, for that reason, has not been well-suited to receiving signals emitted by a transmitter employing a random, pseudo-random, or otherwise unknown frequency-hopping pattern and channel set. Because such information cannot be known by the receiver controller, the receiver cannot intentionally tune to the correct transmission frequency. A common technique to deal with this has been to tune the receiver to a fixed frequency and wait for the transmitter's hopping sequence to intersect it, to employ a blind scan covering a large frequency range, or to hop randomly and arbitrarily. These result in very infrequent reception of the signals of interest.

Another technique is to increase the receiver's passband to the point where the section of radio spectrum received is significantly larger than the bandwidth of the signals of interest (reducing the receiver's selectivity), with the undesirable side effect that the receiver's signal-to-noise ratio decreases to an unsatisfactory level.

All such well-known techniques often result in the receiver's failure to receive the desired signals with sufficient sensitivity or regularity. The problem is exacerbated when the upper or lower bounds of the frequency-hopping range are not known or vary from transmitter to transmitter or from time to time.

A multi-channel radio receiver is customarily used to overcome this problem at the expense of additional cost and complexity when compared to a single-channel receiver. A multi-channel radio receiver is a receiver capable of discerning signals on more than one carrier frequency simultaneously while maintaining a high level of channel selectivity. Such a receiver is generally either a composite of multiple single-channel receivers or utilizes digital signal processing (DSP) technology to mathematically extract multiple channels simultaneously from a broadband signal.

BRIEF SUMMARY

Various example embodiments of the present invention are directed to overcoming one or more of the problems as set forth above, as well as others. For example, an example method is provided for tuning a frequency-agile radio receiver to improve the regularity of reception of discrete frequency-hopping spread spectrum digital radio transmissions, when reception of all such transmissions is not required. The example method may include scanning several radio frequencies where discrete frequency-hopping spread spectrum transmissions of interest may exist, counting the number of discrete transmissions of interest received at each of several frequencies, and creating a frequency-hopping sequence. The frequency-hopping sequence may maximize time spent tuned to those frequencies where a higher portion of transmissions of interest have been received, and reduce time spent tuned to those frequencies where fewer transmissions of interest have been received. As such, listening time may be assigned to those frequencies for which accumulated counter values exceed a predetermined fractional threshold relative to the value of the counter containing the largest accumulated value. According to some example embodiments, the hopping sequence listening time may be assigned to each frequency in a manner proportional to its corresponding accumulated counter value. Additionally or alternatively, the transmission count accumulation may continue indefinitely and take place even while utilizing an optimized hopping sequence, rather than as a separate and discrete scanning step. Related methods, systems, and apparatuses are also provided.

It is an objective to provide a single-channel radio receiver capable of receiving frequency-hopping spread spectrum signals which employ an unknown frequency-hopping pattern.

It is also an objective to provide a means whereby readings taken by a single-channel radio receiver are employed in determining a suitable frequency-hopping pattern for such a receiver without prior knowledge of the transmitter's frequency-hopping sequence.

Some example systems, apparatuses, and methods described herein utilize various functional techniques for receiving frequency-hopping spread spectrum radio signals using a single channel receiver, the manufacturing cost of which is frequently less than that of a multi-channel receiver. Moreover, a multi-channel receiver may also employ these techniques to improve its performance. By employing these techniques, devices employing a radio receiver may be manufactured at lower cost than would otherwise be required by some frequency-hopping spread spectrum radio communications applications.

Some additional example embodiments include an apparatus that includes a radio receiver and processing circuitry. The radio receiver may be configured to tune to a frequency within a plurality of frequencies and provide indications of signals received on the frequency to the processing circuitry. The processing circuitry may be configured to control the radio receiver to scan a plurality of radio frequencies to receive transmissions of interest, determine a count value for each of the scanned frequencies based on a number of transmissions of interest received on each scanned frequency within the plurality of frequencies, determine a frequency-hopping pattern based on the count value for each scanned frequency within the plurality of frequencies, and control the radio receiver to scan select radio frequencies based on the frequency-hopping pattern.

According to some example embodiments, the processing circuitry may be further configured to determine the frequency-hopping pattern such that a time spent scanning a given frequency included within the select radio frequencies is related to the number of transmissions of interest received on the given frequency. Additionally or alternatively, according to some example embodiments, the processing circuitry may be further configured to determine the frequency-hopping pattern such that a time spent scanning a given frequency included within the select radio frequencies is increased as the count value for the given frequency increases. Additionally or alternatively, according to some example embodiments, the processing circuitry configured to determine the frequency-hopping pattern may be configured to determine the frequency-hopping pattern such that a given frequency is included in the frequency-hopping pattern in response to the count value for the given frequency exceeding a threshold. Additionally or alternatively, according to some example embodiments, the processing circuitry configured to determine the frequency-hopping pattern may be configured to determine the frequency-hopping pattern such that a given frequency is included in the frequency-hopping pattern in response to the count value for the given frequency being greater than a threshold percentage of the maximum count value for any scanned frequency. Additionally or alternatively, according to some example embodiments, the radio receiver may be configured to receive a frequency-hopping spread spectrum signal that employs a frequency-hopping transmitting pattern that is unknown to the apparatus. Additionally or alternatively, according to some example embodiments, the processing circuitry is further configured to control the radio receiver to scan the plurality of frequencies in a step-wise pattern across a section of radio frequency spectrum. Additionally or alternatively, according to some example embodiments, the processing circuitry may be further configured to control the single-radio receiver to scan the plurality of frequencies using an interlaced step-wise, random, or pseudo-random pattern across a section of radio frequency spectrum. Additionally or alternatively, according to some example embodiments, the processing circuitry configured to determine the count value for each of the scanned frequencies based on the number of transmissions of interest received on each scanned frequency within the plurality of frequencies may be configured to determine each count value relative to a respective amount of time spent scanning the given frequency. Additionally or alternatively, according to some example embodiments, the processing circuitry may be configured to modify the frequency-hopping pattern based on counts of transmissions of interest received on the select radio frequencies using the frequency-hopping pattern. Additionally or alternatively, according to some example embodiments, the processing circuitry configured to control the radio receiver may be configured to control the radio receiver to scan the plurality of radio frequencies to receive the transmissions of interest, wherein the transmissions of interest include indications of utility metering information. Additionally or alternatively, according to some example embodiments, the radio receiver may be a single-channel radio receiver.

Example embodiments also include example methods. One example method may include controlling, via processing circuitry, a radio receiver to scan a plurality of radio frequencies to receive transmissions of interest, determining a count value for each of the scanned frequencies based on a number of transmissions of interest received on each scanned frequency within the plurality of frequencies, determining a frequency-hopping pattern based on the count value for each scanned frequency within the plurality of frequencies, and controlling the radio receiver to scan select radio frequencies based on the frequency-hopping pattern.

According to some example embodiments, determining the frequency-hopping pattern may include determining the frequency-hopping pattern such that a time spent scanning a given frequency within the plurality of frequencies is related to the number of transmissions of interest received on the given frequency. Additionally or alternatively, according to some example embodiments, determining the frequency-hopping pattern may include determining the frequency-hopping pattern such that a time spent scanning a given frequency is increased as the count value for the given frequency increases. Additionally or alternatively, according to some example embodiments, determining the frequency-hopping pattern may include determining the frequency-hopping pattern such that a given frequency is included in the frequency-hopping pattern in response to the count value for the given frequency exceeding a threshold. Additionally or alternatively, according to some example embodiments, determining the frequency-hopping pattern may include determining the frequency-hopping pattern such that a given frequency is included in the frequency-hopping pattern in response to the count value for the given frequency being greater than a threshold percentage of the maximum count value for any scanned frequency. Additionally or alternatively, according to some example embodiments, controlling the radio receiver to scan the plurality of radio frequencies includes controlling the radio receiver to scan the plurality of radio frequencies for the transmissions of interest as part of a frequency-hopping spread spectrum signal that employs a transmitted frequency-hopping pattern that is unknown to an apparatus performing the method. Additionally or alternatively, according to some example embodiments, controlling the radio receiver to scan the plurality of radio frequencies includes controlling the radio receiver to scan the plurality of radio frequencies in a step-wise pattern across a section of radio frequency spectrum. Additionally or alternatively, according to some example embodiments, controlling the radio receiver to scan the plurality of radio frequencies includes controlling the radio receiver to scan the plurality of radio frequencies using an interlaced step-wise, random, or pseudo-random pattern across a section of radio frequency spectrum. Additionally or alternatively, according to some example embodiments, determining the count value for each of the scanned frequencies may include determining each count value relative to a respective amount of time spent scanning the given frequency. Additionally or alternatively, according to some example embodiments, the example method may further comprise modifying the frequency-hopping pattern based on counts of transmissions of interest received on the select radio frequencies using the frequency-hopping pattern. Additionally or alternatively, according to some example embodiments, controlling the radio receiver may include controlling the radio receiver to scan the plurality of radio frequencies to receive the transmissions of interest, wherein the transmissions of interest include indications of utility metering information. Additionally or alternatively, according to some example embodiments, controlling the radio receiver to scan a plurality of radio frequencies to receive transmissions of interest may include controlling the radio receiver, wherein the radio receiver is a single-channel radio receiver.

In yet another example embodiment, an example method may be provided. The example method may comprise identifying (e.g., by reading a memory location of a memory device) a set of predefined frequencies to be repeatedly scanned. The method may further include controlling, via processing circuitry, a radio receiver to repeatedly scan each frequency within the set of predefined frequencies to receive transmissions of interest. In some example embodiments, as otherwise described herein, the transmissions of interest may be indications of meter readings taken from a utility meter, such as an electronic electric power meter, water meter, gas meter, or the like. In addition to this example method, apparatuses including processing circuitry to perform the method or non-transitory computer readable media with program codes stored thereon to cause an apparatus to conduct the example method when executed are also provided.

Additional example embodiments include non-transitory computer readable media having program code stored thereon, where the program code being configured to, upon execution, cause an apparatus to perform an example method, such as the example methods described above and otherwise herein. Some example embodiments also include devices that comprise various means (e.g., processing circuitry) for performing the functionality of the example methods described above and otherwise herein.

Numerous other advantages and features of example embodiments of the present invention will become readily apparent from the following detailed description, the claims, and the accompanying drawings.

BRIEF DESCRIPTION OF THE DRAWINGS

The details of the operation of example embodiments of the invention are more fully described with reference to the accompanying drawings which form a part hereof and in which like reference numerals refer to like parts throughout.

In the drawings.

All figures are drawn for ease of explanation of the basic teachings of the present invention; the extensions of the figures with respect to number, position, relationship, and dimensions of the parts to form the example embodiments will be explained or will be within the skill of the art after the following teachings of the present invention have been read and understood.

DETAILED DESCRIPTION

While example embodiments of the present invention may take many different forms, there are shown in the drawings and will be described herein in detail specific embodiments thereof with the understanding that the present disclosure is to be considered as an exemplification of the principles of the invention and is not intended to limit the invention to the specific embodiments illustrated.

Figure 1:
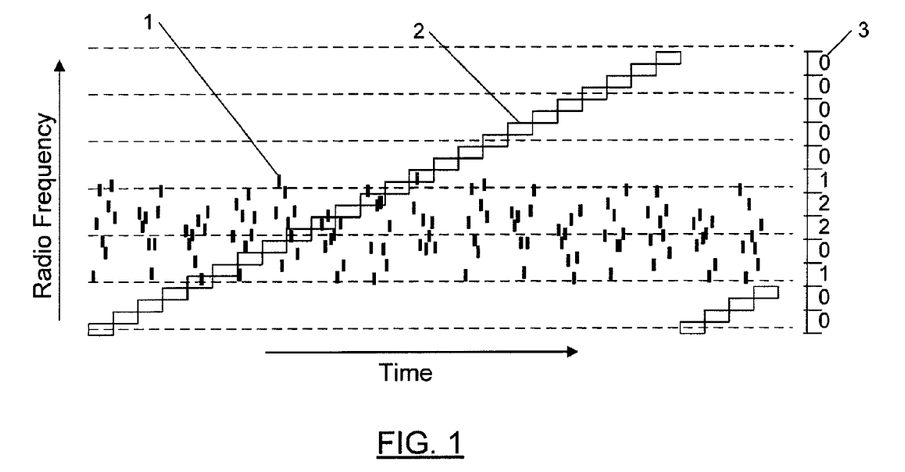
FIG. 1 is a visual representation of a technique for performing a scan for desirable frequency-hopping radio signals across a section of radio frequency spectrum in accordance with the present invention.

Referring now to the drawings in greater detail, there is illustrated in FIG. 1, a technique for adjusting a single channel receiver's carrier frequency in a step-wise fashion over a period of time across a section of radio frequency spectrum suspected to contain transmissions of interest. The transmissions of interest are indicated by solid blocks, an example of which is shown at 1. The passband of the radio receiver is indicated at 2, and can be seen to change over time as managed by the receiver's controller or processing circuitry. As a result of performing tuning in this step-wise fashion, the receiver spends an equal amount of time receiving at numerous carrier frequencies.

Reference numeral 3 indicates the uppermost of the numerous counters which reflect, in a cumulative sense, the number of intersections between the receiver's passband and desirable signals that occurred during the scan. In other words, the counters indicate, for the period of time spent scanning, the number of discrete transmissions that have been successfully received at or near corresponding frequencies.

According to various example embodiments, multiple scans across numerous frequencies may be employed, either stepwise or in another pattern, each step of which may accumulate additional counts. The significant aspect of the resulting counters, as in 3, is that they reflect a more or less statistically balanced view as to the frequency with which transmissions of interest have been received within their corresponding ranges of radio spectrum.

Step-wise adjustment is not the only pattern that can be used for scanning or hopping. One can achieve similar or equivalent results using, for example, a random pattern, a pseudo-random pattern, or an interlaced stepwise pattern similar to the pattern used in the field of video transmission when drawing an interlaced video image.

Figure 2:
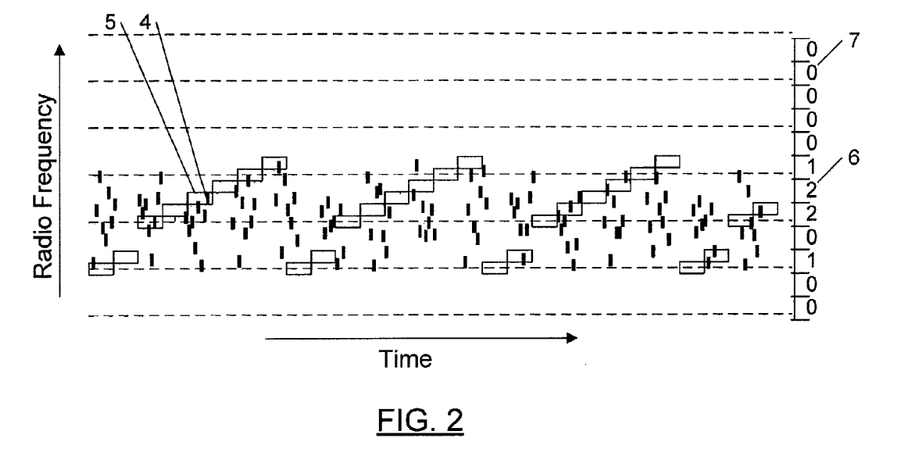
FIG. 2 is a visual representation of optimized, adaptive frequency-hopping based on reception statistics gathered during a scan, as shown in FIG. 1.

Referring now to FIG. 2, which shows the receiver's hopping pattern as determined by the numerous cumulative counters shown, two of which are indicated at 6 and 7, one can see clearly that employing a hopping pattern over frequencies which have been previously observed to intersect with transmissions of interest can result in receiving future transmissions of interest more frequently. This occurs despite the fact that the transmitter's exact frequency-hopping pattern is not known. In the example embodiment portrayed in FIG. 2, the hopping pattern includes only those frequency ranges whose corresponding counters have reached a value of at least half the value of the counter containing the largest value. This threshold is arbitrary; a different threshold may also be used. In this example embodiment, the dwell times on each frequency are equal; but this is not required, as will be explained below.

The transmission indicated by 4 and received when the receiver is tuned to passband 5 indicates an optimized hop where data is received, and the frequency is selected because the corresponding counter for that frequency range, indicated at 6, was "2". In this example embodiment, the value "2" causes the frequency to be selected because, for example, "2" is a value that is greater than a threshold value. Frequency ranges in which few or no signals were received during the scanning portrayed in FIG. 1, such as those with a counter value of zero indicated at 7, are left out of the hopping pattern. This adaptation allows the receiver to spend more time listening on those frequencies with a higher likelihood of containing signals of interest, ultimately resulting in reception of a larger portion of the discrete frequency-hopping spread spectrum transmissions present in the radio spectrum.

The scanning pattern and hopping pattern do not need to be the same. Either one can be stepwise, interpolated stepwise, pseudo-random, random, etc., where, for example, the patterns result in a predictable statistical distribution of total time spent on each frequency. Returning to FIG. 1, one can envision that times spent scanning each frequency need not be equal, and the counter increment accorded any received transmission on that frequency may be made inversely proportional to the relative amount of time spent tuned to said frequency. This will be referred to as the "weighted-vote" technique. In other words, a transmission received on a frequency to which the receiver is devoting more receive time may be proportionately less influential in altering the hopping pattern than a transmission received on a frequency the receiver only occasionally receives on. While the example embodiment portrayed in the figures employs counter increments that are whole numbers, fractional values and whole number multiples may be employed to create increments weighted to inversely correspond to time spent listening on a frequency.

Frequency selection according to an example embodiment is provided in FIG. 2 based on an absolute counter cut-off threshold at a count of 50% of the counter with the maximum value. The threshold could as easily be set to 5%, 10%, 15%, 20%, 25%, 30%, 35%, 40%, 45%, 55%, 60%, 65%, 70%, 75%, 80%, 90%, 95%, or other percentages of the value of the counter with the maximum value. This value may be made adjustable at time of implementation or at time of use to deal with the broadly differing frequency ranges and transmission regularity of different types of frequency-hopping spread spectrum transmitters.

The example embodiment shown in FIG. 1 and FIG. 2 employs two distinct phases: scanning and optimized receiving. The scanning phase of FIG. 1 may be conducted once, followed by a non-terminating optimized receiving phase. Alternatively, the two phases may be alternated (or other sequences may be used, e.g., one scan phase followed by two receive phases) to ensure the frequencies utilized in the optimized hopping pattern accommodate changes in transmitter behavior or interference conditions. Counter values may be reset on each cycle, or their values may be carried from cycle to cycle. When counters overflow the maximum values allowed by their practical implementation, their fractional relationships to one another may be maintained by reducing the value of each by a fixed factor. For example, the value of each counter may be divided by two.

The embodiment described in the figures may be enhanced without deviating from the envisioned method. This enhancement combines the scanning and receiving phases into a single, continuous phase during which the system is constantly both updating received data statistics as well as performing optimized hopping to maximize the likelihood of receiving data.

Combination of these phases can use the "weighted-vote" technique described above. Using this technique may avoid utilizing equal hop durations on all frequencies while scanning, allowing scanning to be continued even while employing optimized hop frequencies.

The threshold cutoff technique shown in the example embodiment may be replaced with a weighted hopping scheme in which the controller determines the relative amount of time a given frequency will be dwelled upon in the hopping sequence based on the relative counter value for that frequency. Rather than using a simple cut-off, the proportional dwell time technique simply reduces time spent on less productive frequencies without eliminating them from the hopping pattern. This technique, when combined with "weighted-vote" counter accumulation, has the benefits of maximizing the amount of time the receiver spends in an optimized hopping pattern while simultaneously maximizing the system's ability to quickly adapt to changes in the transmitter's behavior or the band's interference situation.

An example will further demonstrate this technique. Assume four frequency ranges with accumulated counts of 0, 5, 10, and 5 from an initial scanning phase. The controller can compute a weighted dwell time on each frequency as follows:

Dwell time=(Range Votes)/(Total Votes)*(Time allocated to one full hopping cycle [Tc])

For each of the four ranges, the result is as follows:
Assume Tc=1000 milliseconds
Range 1 dwell time 0/(0+5+10+5)*1000=0/20*1000=0 ms Range 2 dwell time 5/20*1000=250 ms Range 3 dwell time 10/20*1000=500 ms Range 4 dwell time 5/20*1000=250 ms When transmissions are received during any one of these hops, the counters update with a value inversely proportional to the dwell time following the weighted-vote technique, described by this formula:

Counter increment=1*(Time allocated to one full hopping cycle [Tc])/(Dwell time)

A received transmission in range two would increment the corresponding counter by 1*1000/250, or 4. A transmission received in range three, where the receiver spends more time listening, would increment the corresponding counter by 1*1000/500, or only 2.

We may choose to maintain a minimum dwell time for ranges in which no transmissions have been received. This ensures that changes in the transmitter hop pattern or in interference conditions will be detected, and that transmissions received in these previously silent channels will have an immediate impact on the hopping pattern because of their relatively high counter impact.

Figure 3:
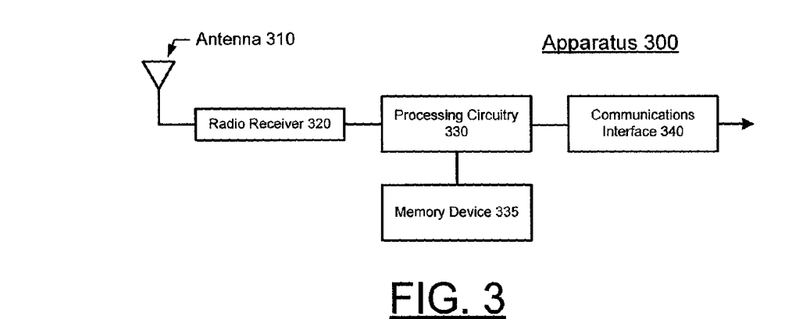
FIG. 3 is a block diagram of an example apparatus for receiving frequency-hopping spread spectrum transmissions according to various example embodiments.

FIG. 3 provides a functional block diagram of an apparatus 300 that is configured to implement various example embodiments of the present invention. The apparatus 300 includes an antenna 310, a radio receiver 320 (which may include the antenna 310), processing circuitry 330, and a communications interface 340. The radio receiver 320 and the antenna 310 may be hardware devices that are designed to receive wireless communications signals and convert those signals into a form that may be analyzed to extract data that is included in the signal. In this regard, the radio receiver 320 may include an antenna, filtering circuitry, an oscillator, and receiver circuitry. The radio receiver 320 may be configured to tune to a frequency within a plurality of frequencies, and provide indications of signals received on the frequency to the processing circuitry 330. The radio receiver 320 may be configured to receive various signals including a frequency-hopping spread spectrum signal that employs a frequency-hopping transmitting pattern that is unknown to the apparatus 300. The radio receiver 320 may be a single- or multi-channel receiver.

The processing circuitry 330 may be configured to control the operation of the apparatus 300 and the components of the apparatus 300 to implement example embodiments described herein. The processing circuitry 330 may include a processor device such as a microprocessor, microcontroller, or the like. The processing circuitry 330 may include a device that is hardware configured such as an application specific integrated circuit (ASIC), a field programmable gate array (FPGA), or the like. In some example embodiments, the processing circuitry 330 may be configured to implement various example embodiments by executing program code stored on a non-transitory computer readable medium, such as the memory device 335. In this regard, the processing circuitry 330 may include a processor that becomes a specially configured machine for implementing various example embodiments upon execution of the program code stored in the computer readable medium. In some example embodiments, the processing circuitry 330 may be disposed within a device that is separate from the radio receiver 320. For example, the processing circuitry 330 may be a component of a device that is operatively connected to the radio receiver 320 via the communications interface 340. In this regard, the processing circuitry 330 may be part of a computer or other device that controls the radio interface 320 via the communications interface 340.

The apparatus 300 may also include a communications interface 340. The communications interface 340 may include hardware configured to communicate data and other information from the processing circuitry 330 to an external device (e.g., a computer, a network, or the like). The communications interface 340 may include hardware that controls the operation of the communications interface 340, or the communications interface 340 may be controlled by the processing circuitry 330. In some example embodiments, the communications interface may be configured to support communications that use universal serial bus (USB) communications protocols and techniques.

As mentioned above, the processing circuitry 330 may be configured to control the apparatus 300 to implement various example embodiments. For example, the processing circuitry 330 may be configured to implement the method of FIG. 5. In this regard, the processing circuitry 330 may be configured at 500 to control the radio receiver 320 to scan a plurality of radio frequencies to receive transmissions of interest. At 510, the processing circuitry 330 may be configured to determine a count value for each of the scanned frequencies based on a number of transmissions of interest received on each scanned frequency within the plurality of frequencies. Further, at 520, the processing circuitry 330 may be configured to determine a frequency-hopping pattern based on the count value for each scanned frequency within the plurality of frequencies, and, at 530, control the radio receiver to scan select radio frequencies based on the frequency-hopping pattern.

According to some example embodiments, the processing circuitry 330 may be further configured to determine the frequency-hopping pattern such that a time spent scanning a given frequency included within the select radio frequencies is related to the number of transmissions of interest received on the given frequency. Additionally or alternatively, the processing circuitry 330 may be further configured to determine the frequency-hopping pattern such that a time spent scanning a given frequency included within the select radio frequencies is increased as the count value for the given frequency increases. Additionally or alternatively, the processing circuitry 330 may determine the frequency-hopping pattern such that a given frequency is included in the frequency-hopping pattern in response to the count value for the given frequency exceeding a threshold. Additionally or alternatively, the processing circuitry 330 may be configured to determine the frequency-hopping pattern such that a given frequency is included in the frequency-hopping pattern in response to the count value for the given frequency being greater than a threshold percentage of the maximum count value for any scanned frequency. Additionally or alternatively, the processing circuitry 330 may be further configured to control the radio receiver to scan the plurality of frequencies in a step-wise pattern across a section of radio frequency spectrum. Additionally or alternatively, the processing circuitry 330 may be further configured to control the radio receiver 320 to scan the plurality of frequencies using an interlaced step-wise, random, or pseudo-random pattern across a section of radio frequency spectrum. Additionally or alternatively, the processing circuitry 330 may be configured to determine each count value relative to a respective amount of time spent scanning the given frequency. Additionally or alternatively, the processing circuitry 330 may be configured to modify the frequency-hopping pattern based on counts of transmissions of interest received on the select radio frequencies using the frequency-hopping pattern. Additionally or alternatively, the processing circuitry 330 may be configured to control the radio receiver to scan the plurality of radio frequencies to receive the transmissions of interest, wherein the transmissions of interest include indications of utility metering information.

Figure 4:
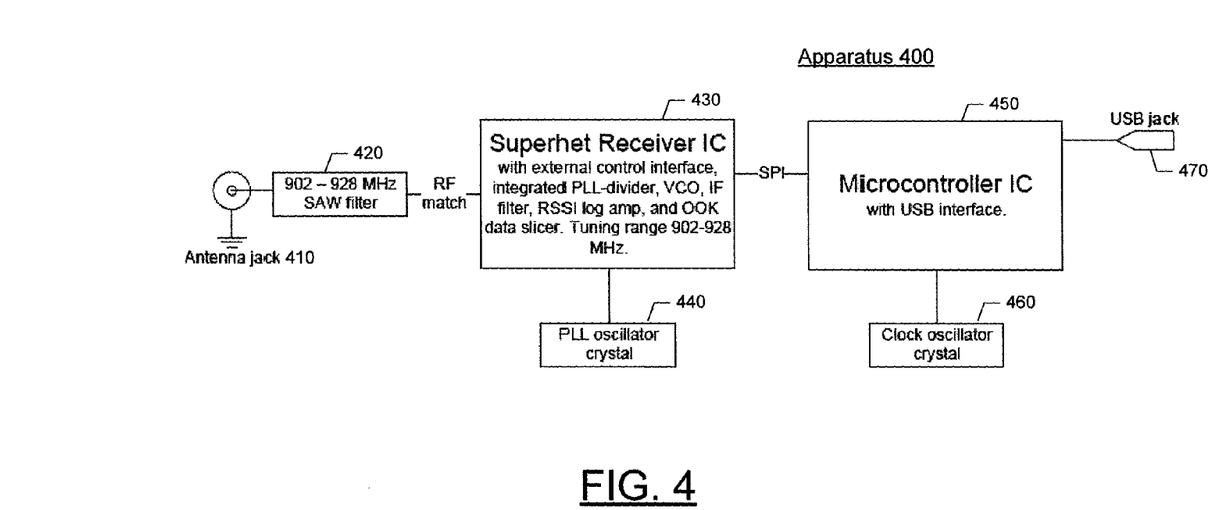
FIG. 4 is a block diagram of another example apparatus for receiving frequency-hopping spread spectrum transmissions according to various example embodiments.
Figure 5:
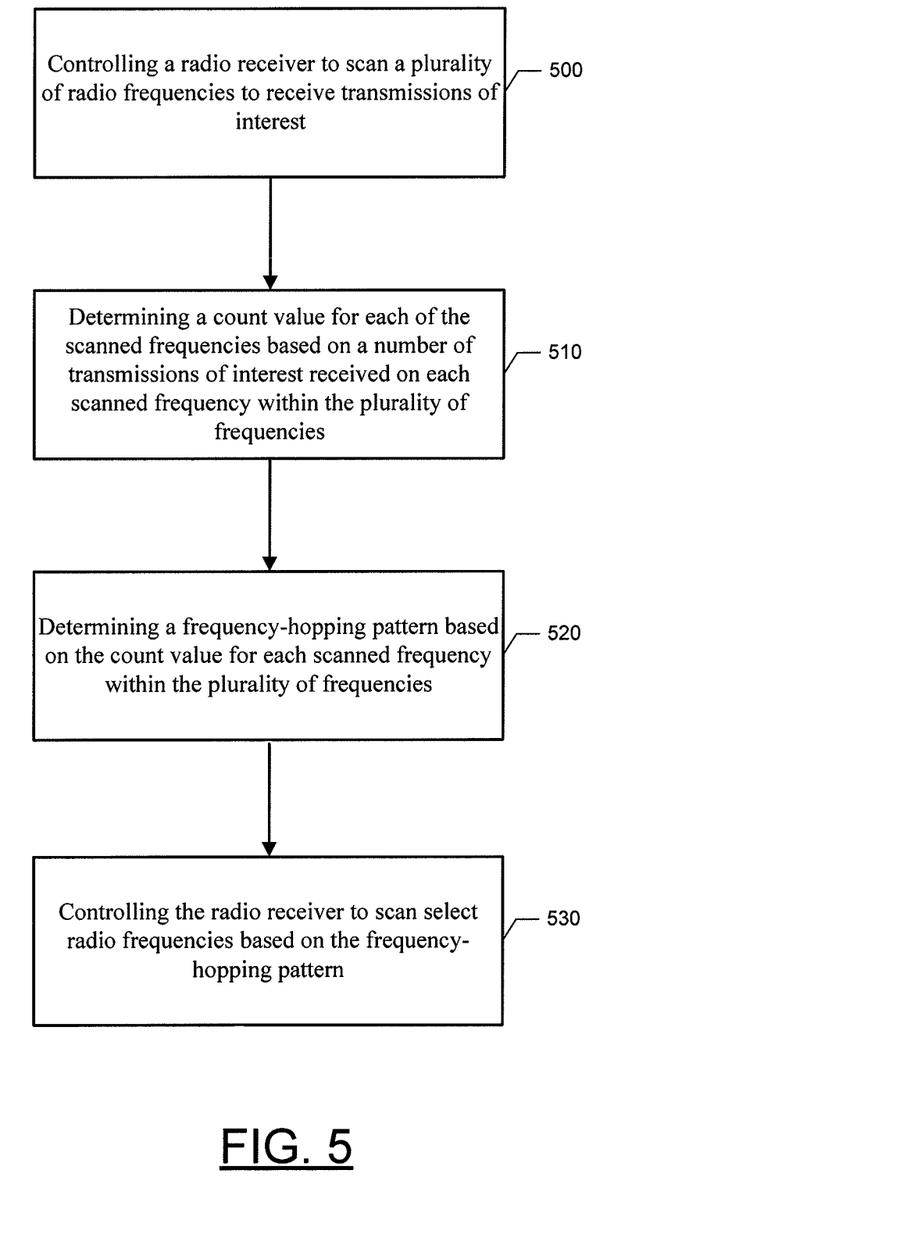
FIG. 5 is a flowchart of an example method according to various example embodiments.

FIG. 4 illustrates a block diagram of a more specific apparatus 400 configured to implement various example embodiments, such as those described with respect to FIGS. 3 and 5. In this regard, the apparatus 400 includes a radio receiver that includes an antenna jack 410 with an attached antenna, a filter 420, a receiver integrated circuit (IC) 430 and an oscillator 440. The apparatus 400 also includes processing circuitry comprising a microcontroller IC 450 and an oscillator 460. The microcontroller IC 450 may be configured to perform the operations of various example embodiments including those described with respect to FIG. 5. Finally, the apparatus 400 also includes a communications interface comprising a USB jack 470.

The terms and expressions employed herein have been used as terms of description and not of limitation. From the foregoing, it will be observed that numerous variations and modifications may be effected without departing from the spirit and scope of the invention. It is to be understood that no limitation with respect to the specific embodiment illustrated herein is intended or should be inferred. While specific embodiments of the invention have been disclosed, one of ordinary skill in the art will recognize that one can modify the particulars of the embodiments without straying from the inventive concept. It is intended that the appended claims cover all such modifications as fall within the scope of the claims.

What is claimed is:

1. An apparatus comprising:
   processing circuitry; and
   a radio receiver communicably coupled to the processing circuitry;
   wherein the radio receiver is configured to:
      tune to a frequency within a plurality of frequencies, and provide indications of signals received on the frequency to processing circuitry;
   and
   wherein the processing circuitry is configured to:
      control the radio receiver to scan a plurality of radio frequencies to receive transmissions of interest,
      determine a count value for each of the scanned frequencies based on a number of transmissions of interest received on each scanned frequency within the plurality of frequencies,
      determine a frequency-hopping pattern based on the count value for each scanned frequency within the plurality of frequencies, and
      control the radio receiver to scan select radio frequencies based on the frequency-hopping pattern.

2. The apparatus of claim 1, wherein the processing circuitry is further configured to determine the frequency-hopping pattern such that a time spent scanning a given frequency included within the select radio frequencies is related to the number of transmissions of interest received on the given frequency.

3. The apparatus of claim 1, wherein the processing circuitry is further configured to determine the frequency-hopping pattern such that a time spent scanning a given frequency included within the select radio frequencies is increased as the count value for the given frequency increases.

4. The apparatus of claim 1, wherein the processing circuitry configured to determine the frequency-hopping pattern includes being configured to determine the frequency-hopping pattern such that a given frequency is included in the frequency-hopping pattern in response to the count value for the given frequency exceeding a threshold.

5. The apparatus of claim 1, wherein the processing circuitry configured to determine the frequency-hopping pattern includes being configured to determine the frequency-hopping pattern such that a given frequency is included in the frequency-hopping pattern in response to the count value for the given frequency being greater than a threshold percentage of the maximum count value for any scanned frequency.

6. The apparatus of claim 1, wherein the radio receiver is configured to receive a frequency-hopping spread spectrum signal that employs a frequency-hopping transmitting pattern that is unknown to the apparatus.

7. The apparatus of claim 1, wherein the processing circuitry is further configured to control the radio receiver to scan the plurality of frequencies in a step-wise pattern across a section of radio frequency spectrum.

8. The apparatus of claim 1, wherein the radio receiver is a single-channel radio receiver.

9. The apparatus of claim 8, wherein the processing circuitry is further configured to control the single-channel radio receiver to scan the plurality of frequencies using an interlaced step-wise, random, or pseudo-random pattern across a section of radio frequency spectrum.

10. The apparatus of claim 1, wherein the processing circuitry configured to determine the count value for each of the scanned frequencies based on the number of transmissions of interest received on each scanned frequency within the plurality of frequencies includes being configured to determine each count value relative to a respective amount of time spent scanning the given frequency.

11. The apparatus of claim 1, wherein the processing circuitry is configured to modify the frequency-hopping pattern based on counts of transmissions of interest received on the select radio frequencies using the frequency-hopping pattern.

12. The apparatus of claim 1, wherein the processing circuitry configured to control the radio receiver includes being configured to control the radio receiver to scan the plurality of radio frequencies to receive the transmissions of interest, wherein the transmissions of interest include indications of utility metering information.

13. A method comprising:
   controlling, via processing circuitry, a radio receiver to scan a plurality of radio frequencies to receive transmissions of interest;
   determining a count value for each of the scanned frequencies based on a number of transmissions of interest received on each scanned frequency within the plurality of frequencies;
   determining a frequency-hopping pattern based on the count value for each scanned frequency within the plurality of frequencies; and
   controlling the radio receiver to scan select radio frequencies based on the frequency-hopping pattern.

14. The method of claim 13, wherein determining the frequency-hopping pattern includes determining the frequency-hopping pattern such that a time spent scanning a given frequency within the plurality of frequencies is related to the number of transmissions of interest received on the given frequency.

15. The method of claim 13, wherein determining the frequency-hopping pattern includes determining the frequency-hopping pattern the frequency-hopping pattern such that a time spent scanning a given frequency is increased as the count value for the given frequency increases.

16. The method of claim 13, wherein determining the frequency-hopping pattern includes determining the frequency-hopping pattern such that a given frequency is included in the frequency-hopping pattern in response to the count value for the given frequency exceeding a threshold.

17. The method of claim 13, wherein determining the frequency-hopping pattern includes determining the frequency-hopping pattern such that a given frequency is included in the frequency-hopping pattern in response to the count value for the given frequency being greater than a threshold percentage of the maximum count value for any scanned frequency.

18. The method of claim 13, wherein controlling the radio receiver to scan the plurality of radio frequencies includes controlling the radio receiver to scan the plurality of radio frequencies for the transmissions of interest as part of a frequency-hopping spread spectrum signal that employs a transmitted frequency-hopping pattern that is unknown to an apparatus performing the method.

19. The method of claim 13, wherein controlling the radio receiver to scan the plurality of radio frequencies includes controlling the radio receiver to scan the plurality of radio frequencies in a step-wise pattern across a section of radio frequency spectrum.

20. The method of claim 13, wherein controlling the radio receiver to scan the plurality of radio frequencies includes controlling the radio receiver to scan the plurality of radio frequencies using an interlaced step-wise, random, or pseudo-random pattern across a section of radio frequency spectrum.

21. The method of claim 13, wherein determining the count value for each of the scanned frequencies includes determining each count value relative to a respective amount of time spent scanning the given frequency.

22. The method of claim 13, further comprising modifying the frequency-hopping pattern based on counts of transmissions of interest received on the select radio frequencies using the frequency-hopping pattern.

23. The method of claim 13, wherein controlling the radio receiver includes controlling the radio receiver to scan the plurality of radio frequencies to receive the transmissions of interest, wherein the transmissions of interest include indications of utility metering information.

24. The method of claim 13, wherein the radio receiver is a single-channel radio receiver and wherein controlling the radio receiver to scan a plurality of radio frequencies to receive transmissions of interest includes controlling the single-channel radio receiver.

25. A non-transitory computer readable medium having program code stored thereon, the program code being configured to, upon execution, cause an apparatus at least to:
control a radio receiver to scan a plurality of radio frequencies to receive transmissions of interest;
determine a count value for each of the scanned frequencies based on a number of transmissions of interest received on each scanned frequency within the plurality of frequencies;
determine a frequency-hopping pattern based on the count value for each scanned frequency within the plurality of frequencies; and
control the radio receiver to scan select radio frequencies based on the frequency-hopping pattern.

26. The medium of claim 25, wherein the program code configured to cause the apparatus to determine the frequency-hopping pattern includes being configured to cause the apparatus to determine the frequency-hopping pattern such that a time spent scanning a given frequency within the plurality of frequencies is related to the number of transmissions of interest received on the given frequency.

27. The medium of claim 25, wherein the program code configured to cause the apparatus to determine the frequency-hopping pattern includes being configured to cause the apparatus to determine the frequency-hopping pattern the frequency-hopping pattern such that a time spent scanning a given frequency is increased as the count value for the given frequency increases.

28. The medium of claim 25, wherein the program code configured to cause the apparatus to determine the frequency-hopping pattern includes being configured to cause the apparatus to determine the frequency-hopping pattern such that a given frequency is included in the frequency-hopping pattern in response to the count value for the given frequency exceeding a threshold.

29. The medium of claim 25, wherein the program code configured to cause the apparatus to determine the frequency-hopping pattern includes being configured to cause the apparatus to determine the frequency-hopping pattern such that a given frequency is included in the frequency-hopping pattern in response to the count value for the given frequency being greater than a threshold percentage of the maximum count value for any scanned frequency.

30. The medium of claim 25, wherein the program code configured to cause the apparatus to control the radio receiver to scan the plurality of radio frequencies includes being configured to cause the apparatus to control the radio receiver to scan the plurality of radio frequencies for the transmissions of interest as part of a frequency-hopping spread spectrum signal that employs a transmitted frequency-hopping pattern that is unknown to the apparatus.

31. The medium of claim 25, wherein the program code configured to cause the apparatus to control the radio receiver to scan the plurality of radio frequencies includes controlling the radio receiver to scan the plurality of radio frequencies in a step-wise pattern across a section of radio frequency spectrum.

32. The medium of claim 25, wherein the program code configured to cause the apparatus to control the radio receiver to scan the plurality of radio frequencies includes being configured to cause the apparatus to control the radio receiver to scan the plurality of radio frequencies using an interlaced step-wise, random, or pseudo-random pattern across a section of radio frequency spectrum.

33. The medium of claim 25, wherein the program code configured to cause the apparatus to determine the count value for each of the scanned frequencies includes being configured to determine each count value relative to a respective amount of time spent scanning the given frequency.

34. The medium of claim 25, wherein the program code is further configured to cause the apparatus to modify the frequency-hopping pattern based on counts of transmissions of interest received on the select radio frequencies using the frequency-hopping pattern.

35. The medium of claim 25, wherein the program code configured to cause the apparatus to control the radio receiver includes being configured to cause the apparatus to control the radio receiver to scan the plurality of radio frequencies to receive the transmissions of interest, wherein the transmissions of interest include indications of utility metering information.

36. The medium of claim 25, wherein the radio receiver is a single-channel radio receiver and wherein the program code configured to cause the apparatus to control the radio receiver to scan a plurality of radio frequencies to receive transmissions of interest includes being configured to cause the apparatus to control the single-channel radio receiver.

37. A method comprising:
identifying a set of predefined frequencies to be repeatedly scanned; and
controlling, via processing circuitry, a radio receiver to repeatedly scan each frequency within the set of predefined frequencies to receive transmissions of interest that include indications of utility meter readings.

* * * * *